United States Patent
Simon

(10) Patent No.: US 6,627,166 B1
(45) Date of Patent: Sep. 30, 2003

(54) GAS FILTERING DEVICE

(76) Inventor: François Simon, 24 rue Marcel Allegot, 92190 Meudon (FR)

(*) Notice: Subject to any disclaimer, the term of this patent is extended or adjusted under 35 U.S.C. 154(b) by 0 days.

(21) Appl. No.: 09/807,382

(22) PCT Filed: Oct. 15, 1999

(86) PCT No.: PCT/FR99/02523
§ 371 (c)(1),
(2), (4) Date: Apr. 12, 2001

(87) PCT Pub. No.: WO00/23173
PCT Pub. Date: Apr. 27, 2000

(30) Foreign Application Priority Data

Oct. 16, 1998 (FR) .............................. 98 13099

(51) Int. Cl.$^7$ .................. B01D 46/00; B01D 53/00
(52) U.S. Cl. ................ 423/210; 423/215.5; 422/122; 422/123; 422/168; 422/177; 422/178; 95/214; 95/215; 95/216; 95/268; 95/270; 95/277; 95/278; 95/282; 95/285; 55/301; 55/304
(58) Field of Search .................. 423/210, 215.5; 95/273, 277, 278, 282, 285, 214, 215, 216, 268, 270; 55/301, 304; 422/168, 177, 178, 122, 123

(56) References Cited

U.S. PATENT DOCUMENTS

| | | | | |
|---|---|---|---|---|
| 5,112,369 A | * | 5/1992 | Brownell | 55/97 |
| 5,536,298 A | * | 7/1996 | Awaji | 95/35 |
| 6,251,168 B1 | * | 6/2001 | Birmingham et al. | 95/268 |
| 6,451,093 B1 | * | 9/2002 | Miles | 95/270 |

FOREIGN PATENT DOCUMENTS

| | | | |
|---|---|---|---|
| DE | 89 05 182.3 U1 | * | 9/1989 |
| GB | 1303250 | * | 1/1973 |
| GB | 1356866 | * | 6/1974 |
| GB | 2279271 A | * | 1/1995 |
| WO | 97/41943 | * | 11/1997 |
| WO | 97/44117 | * | 11/1997 |

* cited by examiner

Primary Examiner—Stanley S. Silverman
Assistant Examiner—Timothy C Vanoy
(74) Attorney, Agent, or Firm—William A. Drucker

(57) ABSTRACT

The invention concerns a device for filtering gas comprising a microporous or microfibrous adsorbent filter (6) and means for forcing an air flow between an exhaust hood (2) and outlet duct (3) for the filtered air. The invention is characterized in that it comprises liquid spraying means (18) and centrifuging means arranged between the spray means and the filtered gas outlet. The particles wetted by the sprayer are blocked by the internal rotary filter and discharged with the carrier liquid towards an external container (10).

15 Claims, 3 Drawing Sheets

Recycling of filtered liquid

GAS FILTERING DEVICE

BACKGROUND OF THE INVENTION

1. Field of the Invention

Figure 1:
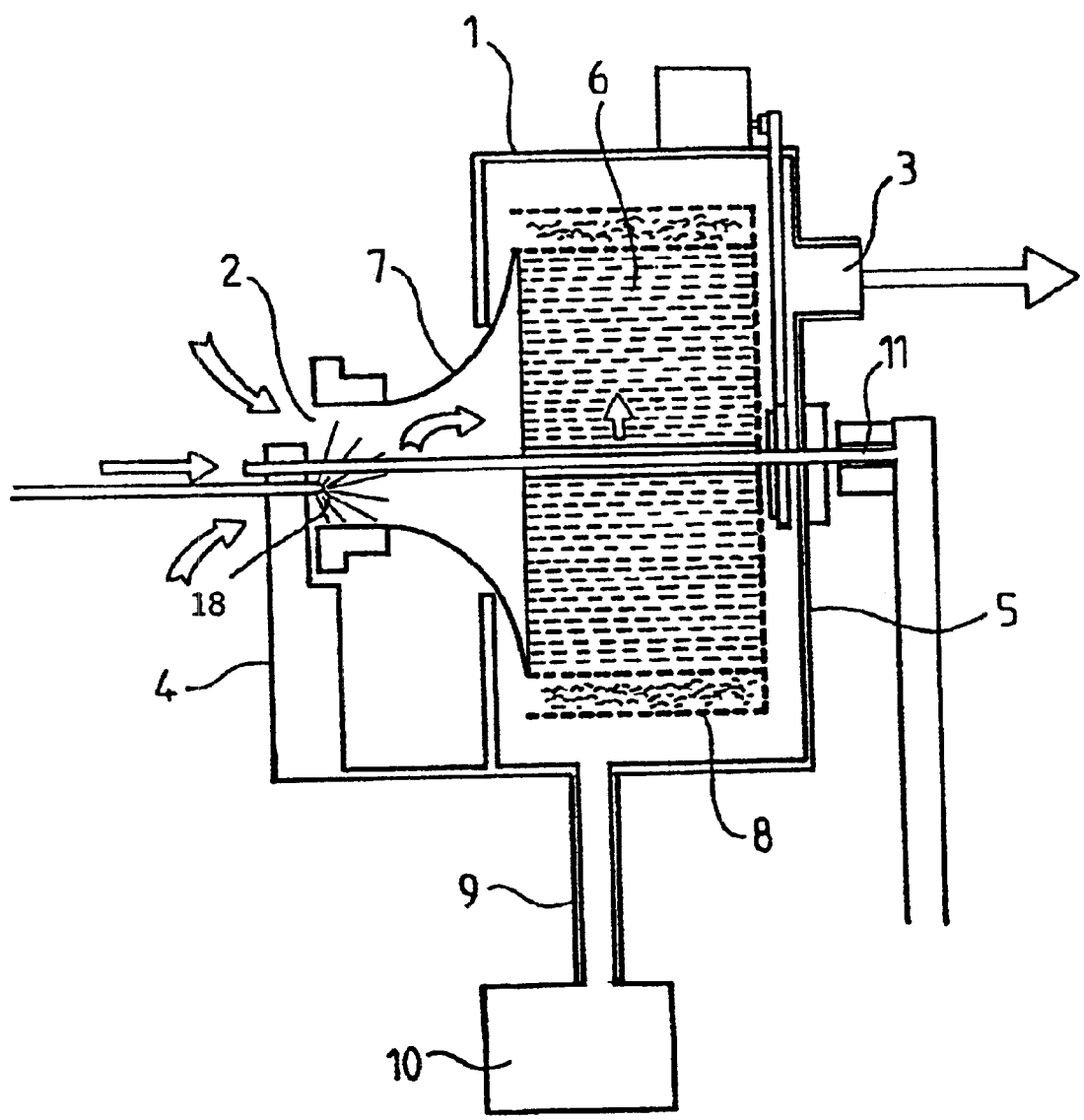
Figure 2:
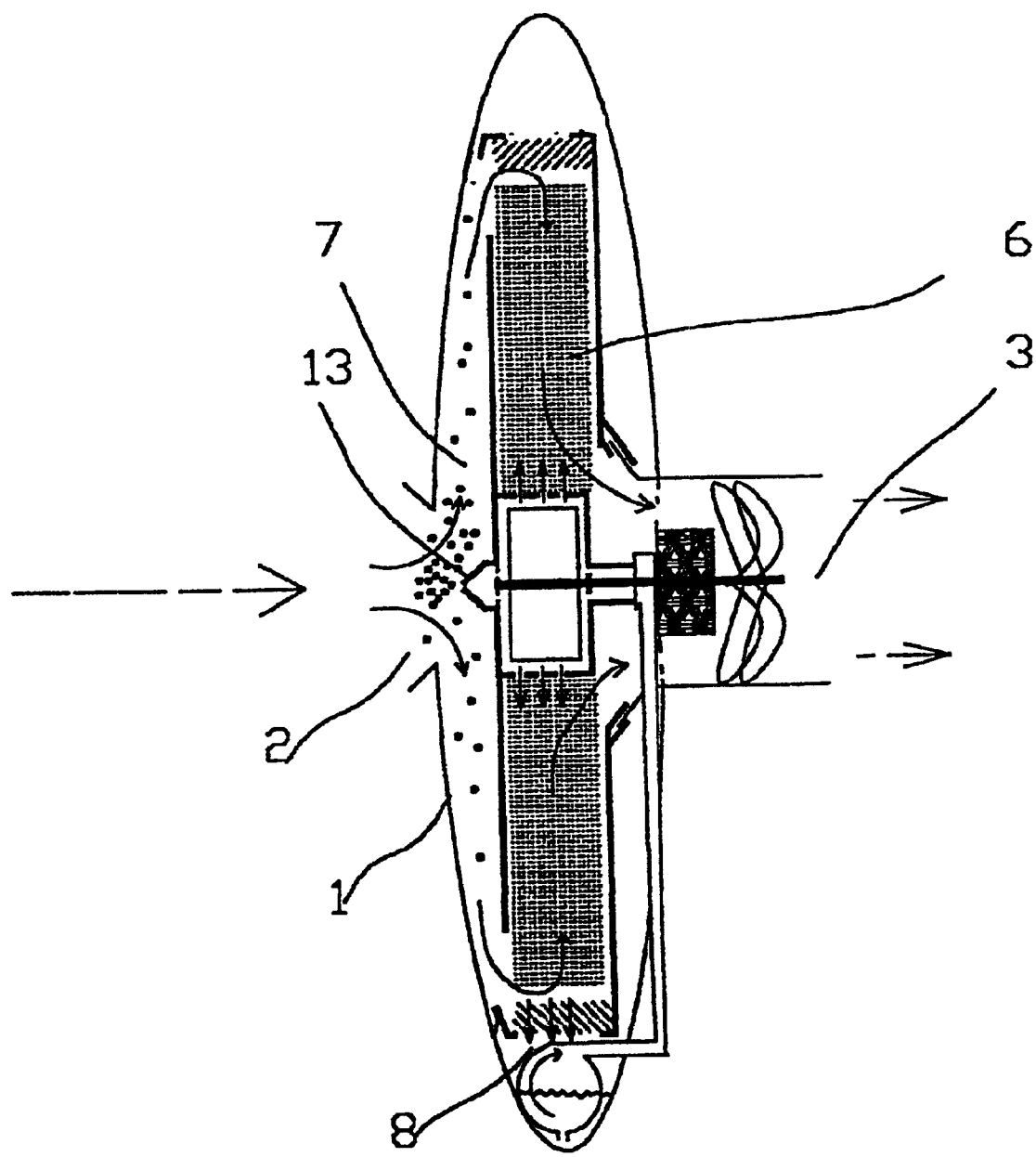

The present invention concerns the field of filtering gases including air. The applications of these devices are multiple: suction devices for household or industrial tasks, air filtering for surgical or industrial clean rooms, air purification for forced ventilation or air-conditioning.

2. Description of the Prior Art

In the prior art, filtering devices are basically constituted by mechanical systems including at least one microporous filter separating the solid particles from the gas medium.

The patents DE8905182, GB2279271 and GB1356866 describe units of conventional filters using filter washing means for the purpose of lubrication.

The patent GB1303250 concerns a filtering unit whose method for capturing particles differs from the invention. The capturing of particles is effected by impacts of the particles on rotating fibres. The basis of the method consists of obtaining the largest possible number of impacts between particles and rotating fibres. The effectiveness of the method depends on the number of impacts, said number needing to be optimised. This patent refers to the problems posed by the fixing of the particles on the filaments and offers a solution, of giving the fibres, which are charged to collect via particles impact, bent inward complex cylindrical-conical shapes. The method used in this patent has certain drawbacks, particularly the explosion of water drips sprayed to wash the fibres. The sprayed liquid is only used to wash the fibres and not to fix the particles or dissolve gases. The method of the invention does not have the implementation problems of this patent.

The application WO 9741943 concerns a filter made of brushes or a conventional filter washed by a cleaning solution. The liquid may or may not be sprayed into the gas depending on the degree of dryness of the gas to be treated. It is the degree of dryness of the gas to be treated which determines if water is sprayed into the gas to be filtered. This spraying is accessory to and dependent on conditions.

The application WO97/44117 describes a gas purifying system which uses a rotary body with a complex structure for creating a large contact surface between a liquid film and the polluted gas. The spraying is only used to create the contact film between the polluted gas and a liquid which is then hydro-extracted. This method has the limitations of conventional filters, namely concerning the size of the particles to be captured. The large particles clog it which can be avoided by increasing the section of the tubes but the capturing effectiveness of the small particles is then reduced.

The devices of the prior art use water to wash conventional filters or increase air/gas contact by spreading a liquid film on complex or simple surfaces.

None of these devices use the fixing capacities of mist or the extremely large contact surface of the spherical droplets of mist.

These devices are not totally satisfactory for several reasons.

Firstly, this filtering method requires the use of increasingly successive finer filters so as to be able to stop the particles of different sizes, and these filters often need to be completed for example by electrostatic filters for stopping the finest particles.

Furthermore, the succession of filters constitutes an obstacle for the flow of the treated gas. During use, the more the filters have stopped particles, the more they obstruct the flow of the gas to be treated which clogs the filters and requires replacements be made or frequent cleanings so as to keep an acceptable yield in the filtering operation.

In addition, the materials separated from the filtered gas remain pulverulent and ill-suited for handling which often requires that the dust and waste collected be treated. These separated matter are bulky and quickly fill the device intended to receive them or even clog it if the device is a filter, this being the case for a household vacuum cleaner.

Moreover, current filters of this type are ill-adapted to filtering extremely small particles or low concentration particles or for filtering gases charged with fumes, particles or dust.

Finally, these filters are unable to eliminate undesirable or toxic gases mixed for example with the air to be purified.

OBJECT OF THE INVENTION

The object of the present invention is to provide a new solution for filtering gases including air and able to put right these drawbacks.

To this effect, the invention concerns for the most part a device conforming to claim 1.

SUMMARY OF THE INVENTION

The gas to be treated is sucked up by suction means, such as a propeller which rotates in the opposite direction of the adsorbing mass. An adsorbent mist is added to the incoming flow to be treated by a mist generator. The gas is mixed with the adsorbent mist and passes through a 'gases path'. The adsorbent mist/gas mixture traverses a rotating adsorbent structure and then the treated gas is removed via the outlet. The reformed liquid and what it has fixed is removed and eventually treated and recycled.

The invention uses the adsorption phenomenon which consists of accumulating a surface at the interface between two phases (gas/liquid or liquid/liquid for example). This derives from intermolecular attraction forces of varied type and intensity for rendering the condensed liquid or solid phases coherent. A molecule irregularly attracted by the other molecules of two phases shall find a position forcibly favourable to the surface of the phase which attracts it most: this shall be called the adsorbent. The adsorbed molecules constitute the adsorbate. If the energy or kinetic conditions enable the molecule to penetrate the adsorbent phase, there is adsorption. Adsorption is a penetration phenomenon with fixing of molecules in an absorbing medium.

Each of the stages of the treatment may be effected in various ways.

The adsorbent mist is most often obtained from water. It can also be obtained from fatty liquid matter, solvents or various chemical solutions. The diameters of the droplets may vary depending on the applications.

The type of sprayed liquid may vary depending on requirements. A spraying of larger droplets can be added to the mist, said droplets carrying out a first fixing of the droplets of the mist by means of coalescence. The mist generator can be a spray nozzle, an ultrasonic system, etc.

It is possible to add to the liquid to make the mist various chemical products, especially detergents, "amphiphylic" substances (hydrophiles and lipophiles).

Electric, electrostatic, heat, luminous and pressure devices can be added to this stage of the process.

A linear path for the gases is the simplest and can suffice.

It is possible to add to the system various elements which optimise its functioning. For example, it is possible to add one or several helical wipers which, when placed in rotation, scrape the wall of the path of the gases and bring towards the rotary adsorbent structure the materials or liquids having been able to be deposited on the wall of the path of the gases.

It is possible to increase the distance traversed by the mist/gas mixture, add various means to favour the gas/mist contacts (wings, baffles) and provoke turbulences also favouring the gas/mist contact to be treated.

It is possible to increase the pressure in the gases path and at the level of the rotary adsorbent structure by a system of increasing pitch rotary wings (then decreasing after the passage through the rotary adsorbent structure).

During the passage of the gases path, it is possible to re-inject the mist of droplets, said mist being different from the first mist.

The rotary adsorbent structure can be embodied according to a large number of methods conforming to the applications of the method.

The simplest structure consists of a thin or thick disk of natural or synthetic microfibres organised into a sufficiently loose network so as to avoid excessively braking the gases to be treated and sufficiently dense or thick to totally adsorb the mist and what it has captured and to which it is fixed.

Other adsorbent structures can be used, such as blades or rotary wings which are adsorbent or coated with adsorbent substances.

Certain materials, such as polypropylene, can advantageously be used having simultaneous absorption and adsorption capacities.

All materials having a high capacity of adsorption can be used, such as fibres or foams with natural or synthetic open cells, certain ceramics having a favourable surface/mass ratio, catalytic ceramics, zeolites, graphite, lamellar halides, aerogels, etc.

As this list is not restrictive, certain applications may require specially adapted materials.

So as to facilitate the desorption phenomenon, it is possible to spray directly on the rotary adsorbent or rinse it by means of liquid injection at its centre and/or apply to it electrical, electrostatic, thermic, chemical, pressure or depression means.

The desorbent liquids may differ from a liquid or liquids used to create the absorbent mist. It is possible to add to the rotary disk-shaped structure one or more peripheral rings made of adsorbent materials which may differ from those of the central adsorbent material.

It is also possible to add to it a conventional peripheral filter on which the filtered materials are compacted and through which the reformed liquid passes.

It is possible to add to the rotary adsorbent material electrical, electrostatic, chemical, thermic means, as well as on the rings or peripheral filters.

It may be advantageous to give the rotary adsorbent material a shape other than simply a cylindrical one (conical, double conical, concave, convex).

It is possible to place several successive rotary structures, which may be identical or different concerning shape or material, in the flow of the gas(es) to be treated and apply to them all the various means described above for a sole adsorbent gas rotary structure and also possible to insert between these structures all the means (mists, droplets, chemical, electrical, electrostatic means, peripheral rings, peripheral filters, removal of liquids) described for a sole adsorbent rotary structure.

So as to remove the treated gases, it is possible to add a final treatment by the preceding methods or any other method.

The liquid effluent can then have the used liquids simply removed and a recycling with or without any treatment until they have been partially or fully used up.

A treatment before re-injection may consist of all the possible liquid treatment methods.

In one particular embodiment, the invention concerns a device for treating gases comprising an adsorbent microporous filter or adsorbent microfibrous filter and means to force a flow of air between a suction opening and a filtered air outlet opening characterised in that it comprises means for spraying a liquid and centrifugal means placed between the spraying means and the filtered gas outlet opening. The particles moistened by the sprayer are blocked by the internal rotary adsorbent filter and ejected with the carrier liquid towards an external receptacle. Advantageously, this receptacle may contain a peripheral filter, concentric to the first which blocks said particles. At this particular moment, the particles are compacted outside the path of the gas. Filtering is thus effected outside the air flow and perpendicular to the direction of movement of the flow. Its circulation is not impeded and the eliminated waste remains outside the flow.

This device can advantageously comprise electric polarisation means able to be applied upstream of the suction opening at the level of spraying of the liquid and the centrifugal means.

This device is able to resolve the drawbacks of filters of the prior art by reducing the head losses of the gas flow during use and ensuring an almost constant retention of filtering qualities, irrespective of the amount of the previously filtered gas.

In addition, this new device permits a simultaneous elimination in a single passage of the gas to be purified of highly diverse substances, such as an air mixture bearing toxic gases, fumes, waste dust and micro-particles transported by the air.

The sprayed liquid increases the mass of the transported substances or fixes or modifies them and is thus able to hydro-extract bodies for which hydro-extraction alone would have been ineffective or extremely difficult. The centrifugal means preferably comprise a cylindrical microporous or microfibrous adsorbent filter, possibly hydrophilic and possibly able to conduct electricity.

According to a first variant, the device of the invention comprises means coaxial to the microporous or microfibrous adsorbent filter for the peripheral collecting of liquid effluent carrying substances to be eliminated.

According to a second variant, the device of the invention comprises front suction means for sucking up the liquid and gas mixture sprayed via the front upstream face of the filter.

According to a third variant, the device of the invention comprises peripheral suction means for sucking up the liquid and gas mixture sprayed via the radial face of the filter.

According to a fourth variant, the device of the invention comprises central suction means for sucking up the liquid and gas mixture sprayed by an axial surface of the filter.

Depending on the choice of the desired embodiment, the liquid is either appears in the form of a mist whose droplets have a section of between 0.1 and 60 $\mu$m and preferably between 0.5 and 6 $\mu$m. For certain embodiments, the liquid is projected in the form of droplets or jets of droplets measuring one millimeter or fractions of a millimeter. For other embodiments, the liquid is projected in the form of a fine sheet so as to moisten as best as possible the contents of the gas to be purified. According to one embodiment variant, the device further comprises means for recycling the sprayed liquid.

Advantageously, the recycling means comprise pulverulent activated carbon possibly impregnated with germicide substances.

According to one implementation variant, the misting liquid contains a fixing or chemical precipitation reactive agent.

According to another implementation variant, the sprayed liquid contains surface-active agents or a highly hydrophilic soluble substance (CaC12 for example).

The filter of the invention is not a conventional filter. A conventional filter stops and retains particles by virtue of its mechanical characteristics (diameter of pores, meshes) even if it is sometimes washed. The device of the invention is basically a mist associated with a mist ejecting fixing device. The ejecting sensor functions via the adsorption/local saturation/desorption of the mist and does not have the constraints of conventional filters. The filtering elements are the mist and the mist "ejecting fixing device".

The method and device of the invention make it possible to carry out filtering operations by adding to the gas to be treated a liquid phase in the form of sprayed liquid followed by the recovery via the adsorption of the added liquid phase in a single passage of a gas to be purified or treated.

The method and device of the invention simply make the most of the complex physico-chemical properties of the mist and the physico-chemical properties of the water droplets or droplets of other liquids converted into the form of mist. The advantages of the liquid microspheres are multiple.

The liquid microspheres do not require any support, such as mobile liquid films, in the gas flow to be treated and are not linked to a loose or rigid support and can have fluid and highly complex paths favouring interactions with the gas to be treated. They offer an extremely large gas/liquid contact surface and make it possible to use to the full the interface, surface and adsorption phenomena.

Moreover, they possess extremely high surface tension which induces effects and surface reactions unable to be provoked by films, as well as an extremely high internal pressure induced by the extremely high surface tension. The liquid of the droplets is under pressure making it possible to "work" chemically and physically in high pressure conditions without having to fully pressurise a device.

The liquid particles possess electrical, electrochemical and electrostatic properties differentiated significantly from liquid films or sprayings in drops as soon as this involves fixing micro-particles or even gases.

The temporary fixing capacities of adsorbent materials combined in structures placed in rotation are higher. These structures are made of microfibres or foams or diverse substances or supports coated with highly adsorbent materials. What is normally called a "filter" but which is not so in the system of the invention may for example be constituted by a very loose network of adsorbent microfibres which blocks nothing unlike filters. Thus, it is possible to use zeolites, aerogels or catalysts.

The centrifugal force can be replaced by other systems, but has the advantage of being easy to use to separate the mist from the temporary fixing mass (microfibres, adsorption) and what it has fixed and to which it is fixed at the time it is mixed with the gas to be treated.

This is the reason why, according to the applications, it is possible to add the spraying of liquid drops or droplets into the mist/gas mixture and/or onto the fixing mass so as to obtain a coalescence of the mist droplets.

The method does not use liquid films for creating a large gas/liquid contact surface (as is the case with the devices of the prior art), but microspheres (mist) which do not need a large and complex shaped surface support so as to spread out as best as possible as occurs in patents using liquid films.

BRIEF DESCRIPTION OF THE DRAWINGS

The invention shall be more readily understood from a reading of the following description relating to non-restrictive examples with reference to the accompanying drawings on which:

FIG. 1 represents a cutaway view of a first embodiment example;

FIG. 2 represents a cutaway view of a second embodiment example;

FIG. 3 represents the skeleton diagram of filtering with a peripheral filter.

DESCRIPTION OF THE PREFERRED EMBODIMENTS

FIG. 1 represents a filtering device comprising a box (1) having a suction opening (2) on the upstream front face (4) and a filtered air outlet (3) on the opposite front face (5). The device comprises a cylindrical filter (6) driven in rotation by an electric motor. The filter is constituted by a microporous material, such as a block of agglomerated fibres or solid porous materials.

In the suction cone (7) placed upstream of the filter (6), injection nozzles (18) spraying a liquid in the form of micro-droplets having an average diameter of about one micron. The mist liquid can be constituted by pure water or water containing or several additives, such as:

- chemical or biochemical reactive agents for fixing certain molecules;
- solvents;
- antibacterial agents;
- silver iodide for deodorising or sterilisation.

The mist liquid can also be constituted by other liquids, such as oils or alcoholic derivatives.

The water or mist liquid is sprayed into the incoming air flow. The solid particles are fixed by the micro-droplets which are sucked up into the rotary filter (6). The rotary filter (6) drives the droplets, possibly charged, towards a peripheral receptacle (8) containing a rotary peripheral filter under the effect of centrifugal force. An evacuation pipe (9) moves the liquid effluent to a recovery tank (10). The liquid effluent can if required be retreated and then recycled so as to be reinjected into the intake chamber (7).

Filtered air is sucked up through the filter (6) towards the evacuation pipe (3). Later, an axial pipe (11) allows radial injection through a perforated spindle of an additional liquid increasing the flow of liquid inside the filter (6).

FIG. 2 shows an embodiment variant.

The device is constituted by a lenticular box (1). It includes an axial suction opening (2) and an axial evacuation opening (3).

The misting liquid is injected into the intake chamber (7) by one or several axial nozzles (13) orientated in the direction of the suction opening (2). The misted liquid flow is thus created in a direction opposite the flow of air to be treated, which increases the effective path where collisions occur between the liquid droplets and the particles to be filtered.

The mist formed in this way is then sucked up through the filter (6) along a radial direction as far as an axial outlet via the evacuation opening (3).

Figure 3:
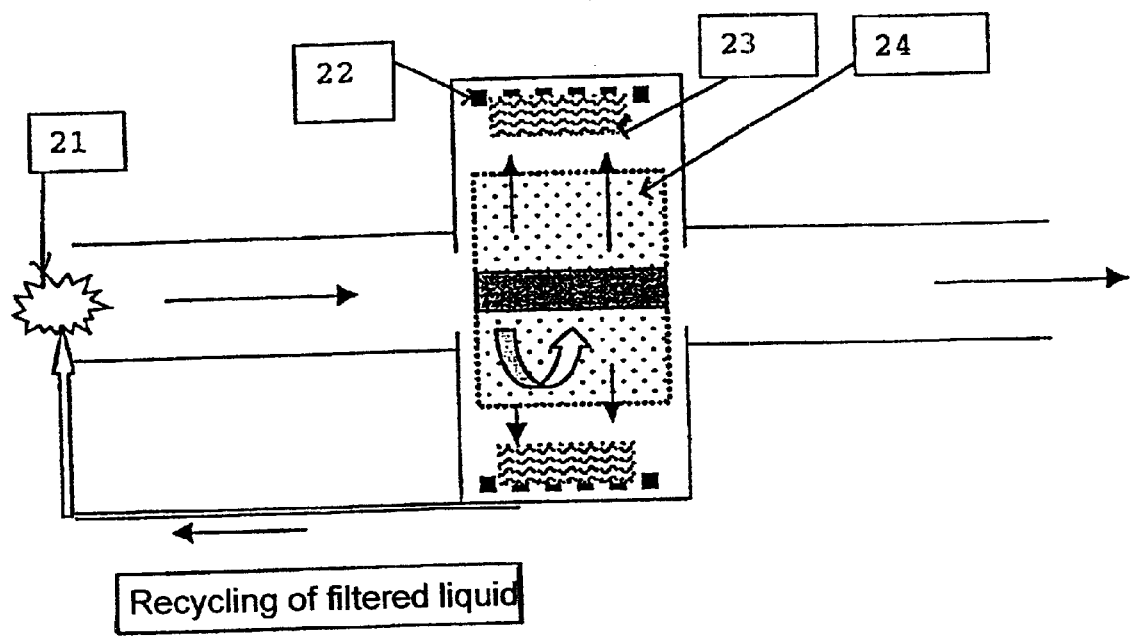

The centrifugal force exerted on the liquid droplets, possibly charged with solid particles, drives the latter in a contrary direction to the flow of filtered air inside the filter. This further increases the possibilities of encounters with the particles to be filtered and the liquid droplets. The liquid effluent is filtered at the periphery, the filtrate is compacted and the effluent is then recovered by a peripheral chute (8) so as to be recycled or removed. FIG. 3 shows the skeleton diagram of filtering with a peripheral filter able to be installed in all the embodiment variants.

The device is a pipe with a system for moving gases and a system for spraying liquids (21). A finely porous material mass permeable to air fixes the droplets produced by the spraying system (21) and what the latter carry, what they have moistened or to what they are fixed. This permeable material mass (24) rotates quickly and radially projects everything it has temporarily fixed.

A rotary filter (22) peripheral to the permeable mass (24) retains and compacts via the effect of centrifugal force the solid materials (23) whilst allowing the liquid injected by the spraying system (21) to pass through and temporarily collected by the permeable mass (24). With or without being treated, the liquid is then sent to the spraying system (21). This system is a machine, one of its major properties is being able to accumulate materials transported by a gas flow by compacting them outside the path of the treated gas and thus avoiding impeding its passage. The path of the treated gas remains in its initial state without clogging until the filter (22) is fully filled.

The material, shape, surface and surface shape of the peripheral filter (22) takes account of the following unusual facts:

the materials to be filtered are moistened and subjected to high pressure owing to the centrifugal force;

owing to the settling due to the moistening effect and that of the centrifugal force, the peripheral filter (22) shall collect and retain a quantity of material taking up far less space (significant advantage) but much larger that made by conventional filters.

The texture, shape, size of pores and the thickness of the rotary peripheral filter (22) are variable, adapted and optimised for each use. It is possible to apply to it electric, electrostatic or electrochemical phenomena mentioned elsewhere in this text. For example, a single sheet of conventional laboratory filter paper is easily able to pick up household dust which is transformed into a sort of felt able to be handled easily.

The invention is described by way of non-restrictive example. A large number of embodiment variants are possible, especially as regards the structure of the rotary filter, the drive mechanisms, the structure of the intake chamber and the misting means, as well as the electric or electrostatic polarisation of mists, related filters and incoming flows.

The adding of a new phase in a particles/gas mixture makes it much simpler to separate phases normally difficult to separate.

It becomes possible in a single passage to extract from a gas polluted with waste (paper) dust, micro-particles, vapours and gases, possibly toxic, and odours without the filter getting clogged up.

In addition, the separated portions of the carrier gas to be treated can be compacted, placed in a solution or precipitated facilitating their handling.

What is claimed is:

1. Method for continuously extracting impurities contained in a gas, said method comprising simultaneously a creation of a flow of gas between a suction opening and a gas outlet opening, a spraying phase of a liquid so as to generate a gas/mist mixture into an upstream portion of the gas flow, and an extraction phase of said mist in the downstream portion of said flow, wherein:

said mist comprises liquid micro-droplets having a diameter of between 0.1 and 6 $\mu$m so as to obtain a first adsorption step of the impurities contained in said gas on said micro-droplets due to attracting forces exerted by said droplets on said impurities, said extraction phase comprising a second adsorption step of the mist by an adsorbent network provided with pores, meshes and passages having sizes higher than the size of said impurities so as to reduce load loss of the gas traversing it and avoid said network to be clogged and a density choosen so as to totally adsorb the mist passing there through and a desorption phase of the mist adsorbed by the adsorbent network.

2. Method according to claim 1, wherein said liquid includes detergent substances and/or amphiphyl substances.

3. Method according to claim 1, wherein the gas/mist mixture is subjected to turbulences.

4. Method according to claim 1, wherein said adsorbent network is driven in rotation and includes adsorbent blades or wings coated with adsorbent substances.

5. Method according to claim 4, wherein said adsorbent network comprises at least one of the following materials: catalytic material, polypropylene, zeolites, graphite, halogens, said materials consisting of fibers forming a network, foams with open cells and/or aerogels.

6. Method according to claim 1, wherein the liquid extracted during the desorption phase is filtered and eventually recycled.

7. Device for extracting impurities contained in a gas which comprises:

means for creating a flow of gas between a section opening and a outlet opening, means for spraying a liquid so as to generate a gas/mist mixture into an upstream portion of the gas flow and, means for extracting said mist in a downstream portion of said flow, wherein said means for spraying a liquid comprises means for forming a mist composed of liquid micro-droplets having a diameter of between 0.5 and 6 $\mu$m, a temporary mass for fixing said mist by means of adsorption and separation means for separating mist from said temporary mass, said adsorption separation means being placed between said suction opening and said outlet opening.

8. Device for treating gas according to claim 7, wherein said separation means comprise a centrifugal device.

9. Device for treating gas according to claim 7, wherein said temporary mass is constituted by a loose network of microfibres whose meshes are unsuitable for mechanically retaining the impurities, and/or zeolites and/or of the foam with open cells and/or aerogels, said temporary mass further including catalysts.

10. Device for treating gas according to claim 7, which further comprises a device for spraying drops or droplets into the gas/mist mixture.

11. Device for treating gas according to claim 7, wherein that said separation means consist of hydro-extraction means comprising a peripheral filter.

12. Device for treating gas according to claim 11, which comprises means for collecting liquid effluent at the periphery of the filter.

13. Device for treating gas according to claim 11, wherein said separation means comprise an upstream front face, a radial surface opposite to said front face and a axial surface extending between said radial surface and said front face, said device further comprising central means for evacuating the gas via said radial surface and peripheral means for evacuating the gas via said axial surface, said gas being sucked up through said front face.

14. Device for treating gas according to claim 7, which comprises first electric polarisation means applied to said mist upstream of the suction opening and second polarisation means located at the level of the separation means.

15. Device for treating gas according to claim 7, which comprises means for recycling the spraying liquid, these means including activated carbon and/or germicide substances.

* * * * *